(12) United States Patent
Ouellette et al.

(10) Patent No.: US 7,990,639 B2
(45) Date of Patent: Aug. 2, 2011

(54) MOBILE EVENT DATA RECORDER WITH MULTIPLE ORIENTATION VIBRATION ISOLATION

(75) Inventors: Marc Ouellette, Ottawa (CA); Terry A. Bisson, Ottawa (CA); Fouad Zeinoun, Gatineau (CA)

(73) Assignee: March Networks Corporation, Ottawa, Ontario (CA)

( * ) Notice: Subject to any disclaimer, the term of this patent is extended or adjusted under 35 U.S.C. 154(b) by 439 days.

(21) Appl. No.: 11/845,502

(22) Filed: Aug. 27, 2007

(65) Prior Publication Data
US 2008/0239654 A1 Oct. 2, 2008

Related U.S. Application Data

(60) Provisional application No. 60/823,592, filed on Aug. 25, 2006, provisional application No. 60/942,049, filed on Jun. 5, 2007.

(51) Int. Cl.
*G11B 5/00* (2006.01)
(52) U.S. Cl. ...... 360/1; 360/31; 369/263.1; 361/679.34; 720/651
(58) Field of Classification Search .............. None
See application file for complete search history.

(56) References Cited

U.S. PATENT DOCUMENTS

| 5,654,875 | A | 8/1997 | Lawson |
| 5,859,765 | A | 1/1999 | Grewe |
| 5,958,212 | A | 9/1999 | Yamamura et al. |
| 6,098,966 | A | 8/2000 | Latvis, Jr. et al. |
| 6,304,440 | B1 | 10/2001 | Lin |
| 6,434,000 | B1 * | 8/2002 | Pandolfi .................. 361/679.33 |
| 6,795,759 | B2 | 8/2002 | Lawson |
| 7,234,153 | B2 | 8/2002 | Jensen |
| 6,525,893 | B1 | 2/2003 | Richter et al. |
| 6,614,747 | B2 | 9/2003 | Imai et al. |
| 6,530,563 | B1 | 11/2003 | Miller et al. |
| 7,177,147 | B2 | 3/2005 | Su |

(Continued)

FOREIGN PATENT DOCUMENTS

CA 2024549 9/1999

(Continued)

OTHER PUBLICATIONS

European Patent Application No. 07800524.6, Search Report dated Jun. 28, 2010.

*Primary Examiner* — Jason C Olson
(74) *Attorney, Agent, or Firm* — Curtis B. Behmann; Borden Ladner Gervais LLP

(57) ABSTRACT

A mobile event data recorder is described providing a contained environmental control system for a hard drive module for use in, or with, a vehicle. A hard drive housing with multiple hard drives and a vibration isolation system are provided within a hard drive module chassis. The vibration isolation system simultaneously provides triaxial isolation in each of two different orientations of the hard drive module. First and second vibration isolators connect the hard drive housing with adjoining walls of the chassis, the first and second vibration isolators positioned to achieve a natural resonant frequency suitable to isolate frequencies in the hard drive operating range, taking into account the forces that will be applied to the vehicle. The natural resonant frequency can be about 10 Hz or less, in order to isolate the hard drives from frequencies of greater than about 10 Hz.

28 Claims, 13 Drawing Sheets

U.S. PATENT DOCUMENTS

| | | |
|---|---|---|
| 6,909,599 B2 * | 6/2005 | Lee et al. ................ 361/679.35 |
| 7,079,380 B2 | 7/2006 | Wubs |
| 2002/0051338 A1 | 5/2002 | Jiang et al. |
| 2003/0081128 A1 | 5/2003 | Kirmuss |
| 2003/0174464 A1 | 9/2003 | Funawatari et al. |
| 2006/0158968 A1 | 7/2006 | Vanman et al. |
| 2006/0232891 A1 | 10/2006 | Bushnik et al. |

FOREIGN PATENT DOCUMENTS

| | | |
|---|---|---|
| EP | 402960 A2 * | 12/1990 |
| EP | 1059693 | 6/1999 |
| JP | 2005129217 | 10/2004 |
| WO | 2007/067775 | 12/2006 |

* cited by examiner

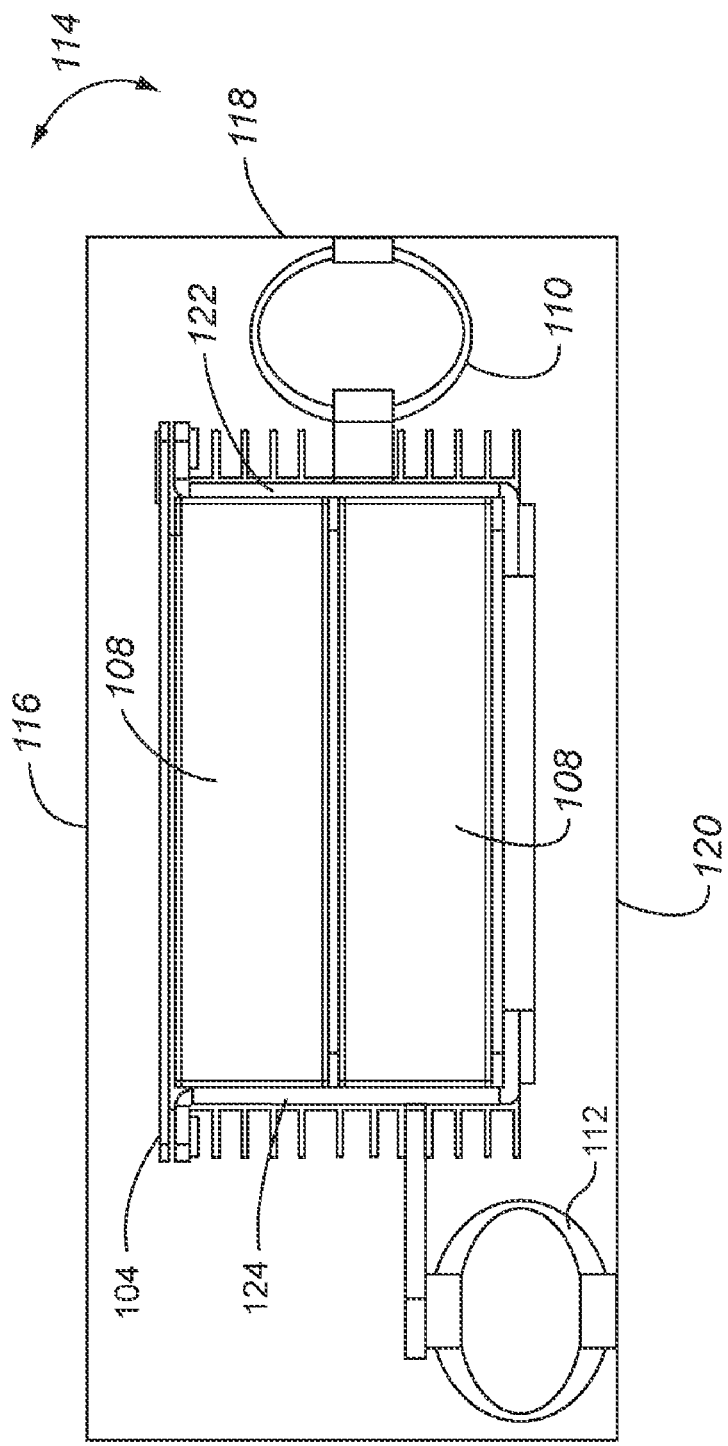
FIG. 6
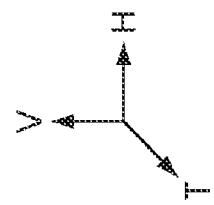

MOBILE EVENT DATA RECORDER WITH MULTIPLE ORIENTATION VIBRATION ISOLATION

CROSS-REFERENCE TO RELATED APPLICATIONS

This application claims the benefit of priority of U.S. Provisional Patent Application No. 60/823,592 filed Aug. 25, 2006, and of U.S. Provisional Patent Application No. 60/942,049 filed Jun. 5, 2007, both of which are incorporated herein by reference.

FIELD OF THE INVENTION

The present invention relates generally to mobile event data recorders. More particularly, the present invention relates to an environmental control system for a hard disk drive in a ruggedized mobile system.

BACKGROUND OF THE INVENTION

Event recorders are used to measure events, such as operator inputs to a train or other vehicle. Such event recorders are similar to "black boxes" in airplanes. Most on-board event recorders record all of this information into (solid state) memory. Data from the solid-state memory can be uploaded if it must be analyzed or reviewed. Solid-state memory is presently 70 times the cost of hard disk storage; therefore, there is a commercial advantage if hard drives could be used. However, recording technologies for use in rail applications and similar applications must be incredibly rugged.

FIG. 1 shows one approach in which a hard drive 10 is provided within an event recorder data pack 12, for mounting to a mounting surface 14 of a vehicle. The entire event recorder data pack unit 12 including all elements housed within the outer casing is vibration isolated using external vibration isolators 16. External connections 18, which can be rigid or semi-rigid, will also affect the isolation system performance, and the degree of their effect is uncontrollable in that it is dependent on the installation. This approach can be difficult because of the size of the envelope. Also, the vibration isolators to isolate the entire unit from the exterior are expensive.

FIG. 2 shows another approach in which only a hard drive housing 20 is vibration isolated within a hard drive module 28 provided within the outer casing of an event recorder data pack unit 22. Using internal vibration isolators 26, vibration isolation is done internally to the hard drive module chassis. Other environmental control functions can also be performed internal to the hard drive module chassis. This reduces cost, and improves application since, as shown in FIG. 2, the unit 22, or a mobile digital video recorder in which it is mounted, can be bolted directly to a mounting surface 24 of a vehicle. One such approach for using hard disk storage in a mobile event recorder is described in commonly assigned U.S. patent application Ser. No. 11/106,515 filed on Apr. 15, 2005 entitled "Contained Environmental Control System for Mobile Event Data Recorder", which is incorporated herein by reference. New storage requirements demand the use of multiple hard drives of larger (though fairly standard) physical size and capacity.

Most approaches isolate vibration forces from more than one direction. U.S. Pat. No. 7,234,153 issued on Jun. 19, 2007 to Jensen and is entitled "Vibration Damper for Dampening Vibrations at Low Frequencies". In this approach, two springs are mutually connected on the same side of a vibration sensitive item to dampen vibration in a way that can compensate for both horizontal and vertical vibration. It is intended to isolate light vibration sensitive elements from a vibration generating base at relatively low frequencies (below 180 Hz). This system does not provide vibration isolation in more than one mounting orientation of the vibration sensitive item.

It can be advantageous to provide a ruggedized environment, including enhanced vibration isolation for more than one hard drive mounting orientation. United States Patent Application Publication No. 2006/0158968 published Jul. 20, 2006 of Vanman et al. is entitled "Method of and System for Mobile Surveillance and Event Recording". Four silicon oil-filled dampers stabilize the floating mechanism. An oil filled damper can usually only provide damping or isolation in one direction. A spring must be manually pivoted so that it can handle a gravity load in the direction of mounting. It therefore cannot provide multiple orientation vibration isolation without a manual change to the system.

Another known isolator configuration shown in FIG. 3 attempts to deal with vibration in multiple orientations. A hard drive housing 30 including two standard hard drives is isolated within a chassis of a hard drive module 32. Two isolators 34 on the bottom of the hard drive housing 30 are intended to provide isolation, and two further isolators 36 on the right are intended to provide stabilization. However, this approach using two isolators on the side does not permit practical motion because it is too stabilized. This system does not isolate all of the vibrations in various hard drive operable ranges, as they vary based on applied force of vibration, since the natural resonant frequency is too high.

It is, therefore, desirable to provide an improved mobile event data recorder having a vibration isolation system that isolates vibrations in more than one mounting orientation and isolates frequencies in the hard drive operating ranges.

SUMMARY OF THE INVENTION

The present invention obviates or mitigates at least one disadvantage of previous vibration isolation techniques for mobile event recorder data packs.

In an aspect, the present invention provides a mobile event recorder data pack system for use in a vehicle. The system includes an outer enclosure against which a hard drive module is sealed, and in which contents of the hard drive module are sealed. The hard drive module includes a hard drive module chassis, a plurality of standard hard drives, a hard drive housing retaining the plurality of standard hard drives, and a multiple orientation vibration isolation system. The multiple orientation vibration isolation system is provided between the hard drive housing and the hard drive module chassis to simultaneously provide triaxial vibration isolation when the mobile event recorder data pack system is mounted in a vertical mounting position or in a horizontal mounting position. The multiple orientation vibration isolation system includes first and second vibration isolators connecting the hard drive housing with adjoining walls of the hard drive module chassis. The first and second vibration isolators are positioned to achieve a natural resonant frequency of less than about 10 Hz, for example below 5 Hz, or about 2 Hz.

The multiple orientation vibration isolation system can isolate the hard drives from vibration frequencies greater than about 2 Hz, for example greater than about 5 Hz, or greater than about 10 Hz. In an embodiment, the multiple orientation vibration isolation system isolates the hard drives from vibration frequencies between about 10 Hz and about 500 Hz. The multiple orientation vibration isolation system can limit a peak to peak displacement of the hard drive housing to between about 0.5 inches and about 1.0 inch. The hard drive module housing and the hard drives can have a combined weight of about 6 lbs.

The adjoining walls of the hard drive module chassis can include a short wall and a long wall. The first vibration isolator can comprise a single vibration isolator coupling the hard drive module housing to the chassis near a mid-point of the short wall of the chassis. The second vibration isolator can comprise a single vibration isolator coupling the hard drive module housing to the chassis near an opposing corner of the long wall of the chassis, the opposing corner being opposite a joining corner where the adjoining walls meet.

The hard drive housing can have first and second opposing short sides. The first short side is near the joining corner of the long wall of the hard drive module chassis. The second short side is near the opposing corner of the long wall of the hard drive module chassis. The first vibration isolator can be mounted near a mid-point of the first short side of the hard drive housing. The second vibration isolator can be mounted between a mid-point and a corner of the second short side of the hard drive housing.

The multiple orientation vibration isolation system can isolate a horizontal vibration force and a vertical vibration force in a plane perpendicular to the horizontal vibration force such that a resultant vibration motion is in circular form and in the same plane as the horizontal vibration force with a smaller magnitude than the horizontal vibration force.

The first and second vibration isolators can be first and second wire rope vibration isolators. The first vibration isolator can comprise a first wire rope vibration isolator having first upper and lower retaining bars retaining only two wire loops. The first wire loop can be mounted at a first end of the first upper and lower retaining bars. The second wire loop can be mounted at an opposing end of the first upper and lower retaining bars. The second vibration isolator can comprise a second wire rope vibration isolator having second upper and lower retaining bars retaining a plurality of wire loops between opposing ends of the second upper and lower retaining bars.

The mobile event recorder data pack system can further include a heat dissipation system to transfer heat from the standard hard drives to outside the outer enclosure without an air passage to the outside of the sealed outer enclosure.

The heat dissipation system can include: an internal heat sink inside the hard drive module; an external heat sink outside the outer enclosure; and a thermoelectric module placed between the internal and external heat sinks without breaking an environmental seal between the external heat sink and the outer enclosure. The heat dissipation system can further include: an external fan mounted to the external heat sink; an internal fan mounted to the internal heat sink; and/or a hard drive module heat sink connected to the hard drives. The mobile event data recorder can further include a temperature control system and a humidity control system.

In another aspect, the present invention provides a hard drive module for an mobile event recorder data pack system for use in a vehicle. The hard drive module includes a hard drive module chassis, a plurality of standard hard drives, a hard drive housing retaining the plurality of standard hard drives, and a multiple orientation vibration isolation system. The multiple orientation vibration isolation system is provided between the hard drive housing and the hard drive module chassis to simultaneously provide triaxial vibration isolation when the mobile event recorder data pack system is mounted in a vertical mounting position or in a horizontal mounting position. The multiple orientation vibration isolation system includes first and second vibration isolators connecting the hard drive housing with adjoining walls of the hard drive module chassis. The first and second vibration isolators are positioned to achieve a natural resonant frequency of less than about 10 Hz, for example below 5 Hz, or about 2 Hz.

In a further aspect, the present invention provides a mobile event recorder data pack for use in a vehicle, including a hard drive module. The hard drive module includes a hard drive module chassis, a plurality of standard hard drives, a hard drive housing retaining the plurality of standard hard drives, and a front cover plate defining an accessory opening. The mobile event recorder data pack further includes: an outer enclosure against which the hard drive module is sealed, and in which contents of the hard drive module are sealed, the outer enclosure defining a hard drive module opening to receive the hard drive module; a heat dissipation system to transfer heat from the hard drives to outside the sealed outer enclosure without an air passage to the outside of the sealed outer enclosure, the heat dissipation system mating with the accessory opening in the front cover plate of the hard drive module; a hard drive module environmental seal to seal the heat dissipation system to the front an outer chassis environmental seal co-operating with the outer enclosure and the hard drive module to form a sealed casing; and a multiple orientation vibration isolation system. The multiple orientation vibration isolation system is provided between the hard drive housing and the hard drive module chassis to simultaneously provide triaxial vibration isolation when the mobile event recorder data pack system is mounted in a vertical mounting position or in a horizontal mounting position. The multiple orientation vibration isolation system includes first and second vibration isolators connecting the hard drive housing with adjoining walls of the hard drive module chassis. The first and second vibration isolators are positioned to achieve a natural resonant frequency of less than about 10 Hz, for example below 5 Hz, or about 2 Hz.

The mobile event recorder data pack system can further include: an outer chassis environmental seal provided between the hard drive module and the hard drive module opening; and a front cover environmental seal provided between the front cover plate and the heat dissipation system. The heat dissipation system can further include: an internal heat sink inside the hard drive module; an external heat sink outside the chassis; a thermoelectric module placed between the internal and external heat sinks without breaking an environmental seal between the external heat sink and the sealed hard drive module chassis; an external fan mounted to the external heat sink; an internal fan mounted to the internal heat sink; and a hard drive module heat sink connected to the hard drives.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 6 illustrates a multiple orientation vibration isolation system according to an embodiment of the present invention in a first orientation;

DETAILED DESCRIPTION

Generally, the present invention provides a mobile event data recorder providing a contained environmental control system for a hard drive module for use in, or with, a vehicle. A hard drive housing and a vibration isolation system are provided within a hard drive module chassis. The vibration isolation system simultaneously provides triaxial vibration isolation in each of two different orientations of the hard drive module. First and second vibration isolators connect the hard drive housing with adjoining walls of the chassis. The first and second vibration isolators are positioned to achieve a natural resonant frequency suitable to isolate frequencies in the hard drive operating range, taking into account the forces that will be applied to the vehicle. The natural resonant frequency is about 10 Hz or less, in order to isolate the hard drives from frequencies of greater than about 10 Hz.

Figure 4:
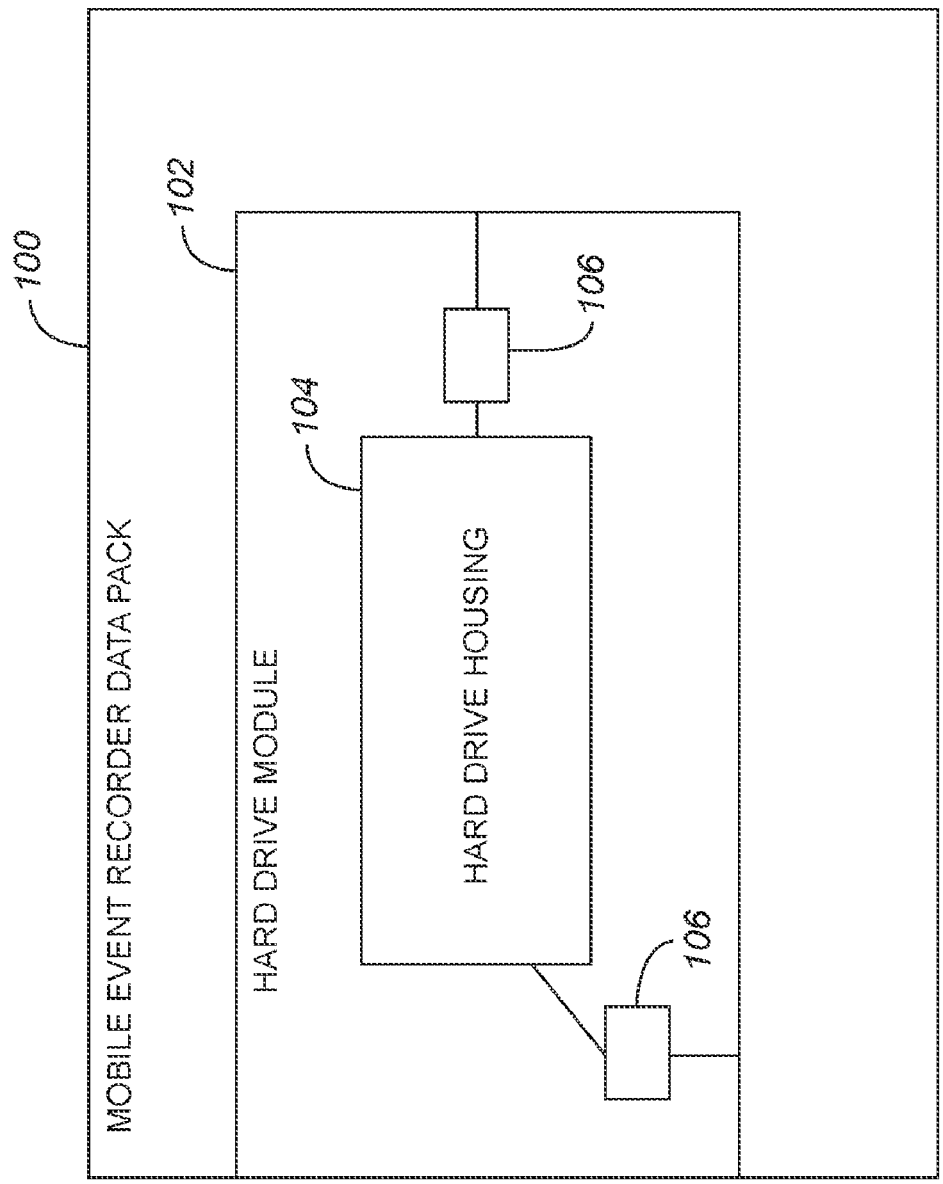
FIG. 4 is a block diagram of an event recorder data pack for a mobile digital video recorder according to an embodiment of the present invention.

FIG. 4 is a block diagram view of an event recorder data pack for a mobile digital video recorder according to an embodiment of the present invention. The data pack 100 is sealed, and includes a hard drive module 102, which itself is preferably also sealed. A hard drive housing 104 holding two or more hard drives is provided within the hard drive module 102. A multiple orientation vibration isolation system 106 is shown in block diagram form, and will be described later in detail, as will an optional heat dissipation system (not shown).

In general, "environmental control" of an event recorder data pack, or a mobile hard drive unit within such a data pack, can include control of the following factors:

1. Temperature
2. Humidity
3. Electrical (e.g. surge, transient).
4. Immunity (e.g. electrostatic discharge—ESD, electromagnetic compatibility—EMC, etc.)
5. Vibration
6. Exposure (enclosed for handling)

With respect to temperature, this can include active devices according to embodiments of the present invention. The transfer mechanism can be specific to the drives, i.e. only the drives are temperature controlled, in order to reduce power and cost. This is discussed in further detail later. Relating to humidity, embodiments are preferably sealed to the IP65 specification. Electrical issues can often be handled by the power supply of the unit. For the vibration isolation, a novel use of the points of mounting of the vibration isolators enables the support for multiple hard drive orientations, which will be described later in further detail. The entire data pack can be enclosed for handling, such that it is easily removable. The battery and hard drives for the system can be enclosed within a single line replaceable unit (LRU), along with all of the systems to control the various environmental factors listed above. In one embodiment the unit includes the temperature, multiple orientation vibration isolation and humidity controls. In another embodiment, features 1 and 5 are provided within the unit, which can be enclosed as per feature 6.

A vibration isolation system according to an embodiment of the present invention provides vertical and horizontal vibration isolation when the hard drive module is in either of two mounting orientations, without requiring any modifications to the setup. Known approaches only allow for the hard drive to be mounted horizontally or vertically, or require modification when changing from one mounting orientation to the other. Moreover, they do not simultaneously provide triaxial vibration isolation in either or both of those mounting positions, in a way that isolates frequencies in a hard drive operable range for a variety of applied forces.

It is worth noting that hard drive operable ranges vary depending on the magnitude of the applied force. For an event recorder data pack according to an embodiment of the present invention, it is desirable for the unit to be able to operate normally under the conditions outlined in Society of Automotive Engineers (SAE) standard J1455, Recommended Environmental Practices for Electronic Equipment Design in Heavy-Duty Vehicle Applications. It is also desirable for the unit to function normally when mounted horizontally and vertically.

The following tests were performed for a mobile event recorder data pack in relation to the U.S. highway truck vibration exposures figure 514.5C-1:

TEST #1 Vertical direction: MIL-STD-810F, figure 514.5C-1 vertical inputs, U.S. highway truck vibration exposures for a 2 hr duration.

TEST #2 Transverse direction: MIL-STD-810F, figure 514.5C-1 longitudinal inputs, U.S. highway truck vibration exposures for a 2 hr duration.

TEST #3 Longitudinal direction: MIL-STD-810F, figure 514.5C-1 longitudinal inputs, U.S. highway truck vibration exposures for a 2 hr duration.

TEST #4 Vertical direction: 1G sine sweep from 10-500 Hz, 20 min sweep, 2 hr total.

TEST #5 Transverse direction: 1G sine sweep from 10-500 Hz, 20 min sweep, 2 hr total.

TEST #6 Longitudinal direction: 1G sine sweep from 10-500 Hz, 20 min sweep, 2 hr total.

At these vibration levels the area of the event recorder data pack at highest risk for failure is the hard drives. One exemplary set of hard drive maximum allowable vibration levels for a corresponding applied force was determined to be:

| | |
|---|---|
| 5-22 Hz | 0.25 Gs |
| 22-350 Hz | 0.50 Gs |
| 350-500 Hz | 0.25 Gs |

Given the input levels above, the hard drive will not be able to read or write without sufficient vibration isolation. Any vibration isolation system used will have a natural frequency that will amplify the input levels and transfer that input to the hard drives. It was determined by bench top testing on a vibration table that the allowable input levels seen by the drives could exceed the above limits for the lower frequency range of 5-50 Hz. In that range, the drives can operate normally under an applied force of up to about 1 g.

Taking the above items into consideration, embodiments of the present invention include a vibration isolation system with a natural frequency below about 10 Hz, thus isolating all frequencies above that. In an embodiment, wire rope isolators are used in the vibration isolation system.

Figure 3:
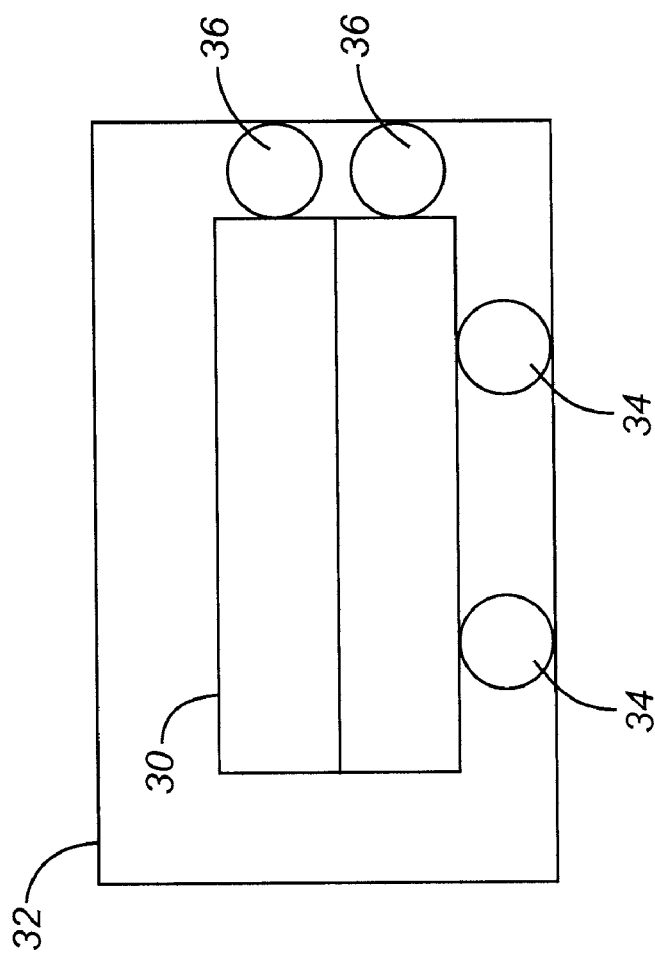
FIG. 3 illustrates a known approach to vibration isolation.

The approach of FIG. 3, as previously described, may be suitable to suppress frequencies of 50 Hz and up. However, it is not suitable to handle all frequencies from 10 Hz and up, which as determined above is in the range of desired frequencies to be isolated for mobile hard drive applications. For an approach to handle 10 Hz and up, about 0.3 inches of available motion is required to allow the hard drive module to have a distance of travel sufficient to be isolated from an applied vibration force. A larger range of motion can be preferable. A system according to an embodiment of the present invention isolates the hard drives from vibration having a frequency of vibration above about 10 Hz, and in an embodiment from about 10 to about 500 Hz.

The amount of force of the vibration should also be considered, and can be in the range of 1 g. Combining the force and the frequency (time) provides a resulting displacement. At 1 g and 100 Hz, the resulting peak to peak displacement can be about 0.002 inches or less, which cannot be perceived by the human eye. At 1 g and 10 Hz, the resulting peak to peak displacement can be about 0.2 inches. For 1 g and 5 Hz, the peak to peak displacement is about 0.8 inches. For an entire cycle, the peak to peak displacement D can be anywhere from about 0.5 to about 1.0 inches.

Figure 1:
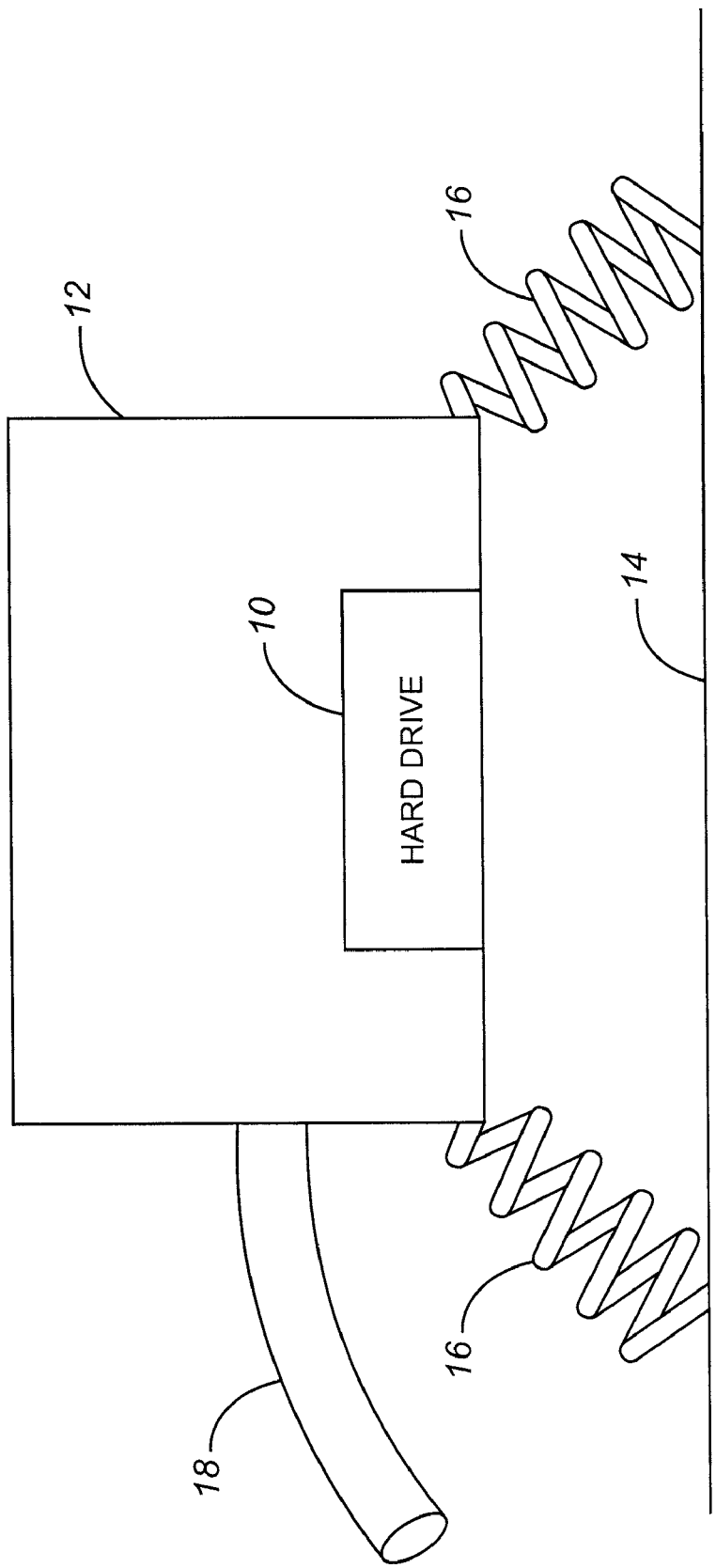
FIG. 1 illustrates an event recorder where the entire unit is vibration isolated.
Figure 2:
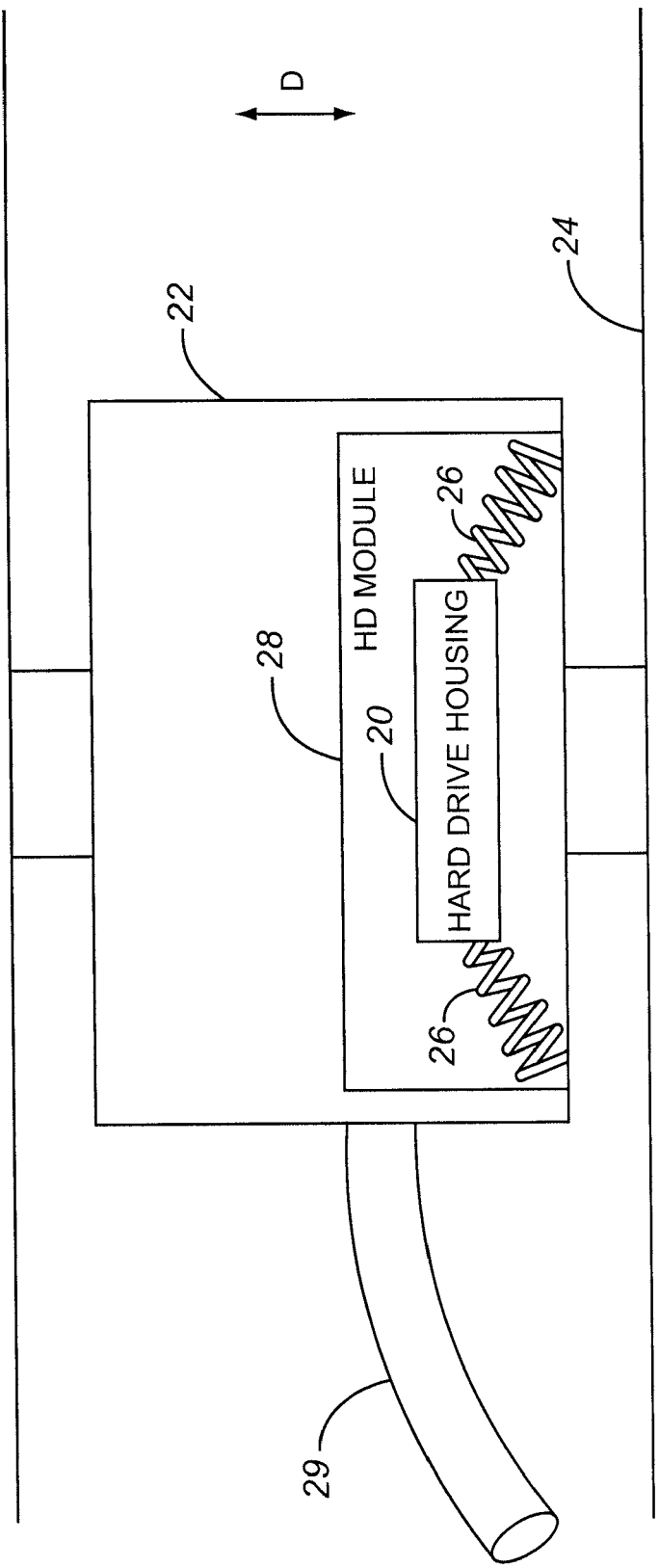
FIG. 2 illustrates a sealed event recorder that can be mounted directly to its environment, since vibration isolation is provided internally.

If there is up to 1 inch of travel, the hard drive module needs to be able to have a lot of motion to be able to isolate this travel. To isolate an object, the object must be allowed to move through a range, i.e. the stiffer the system, the higher the natural frequency of that system. Referring back to FIG. 2, suppose the data pack 22 has a peak to peak range of motion D of about 1 inch. To isolate the hard drive housing 20 completely, the hard drive module needs to have a peak to peak range of motion D equivalent to that of the data pack. In this example, the hard drive housing 20 has to be able to move at least 1 inch, i.e. have at least a 1 inch clearance. With that clearance, the data pack can move its 1 inch and the hard drive module can be isolated so that it does not move in an absolute sense, even though it is "moving" relative to the data pack.

Figure 5:
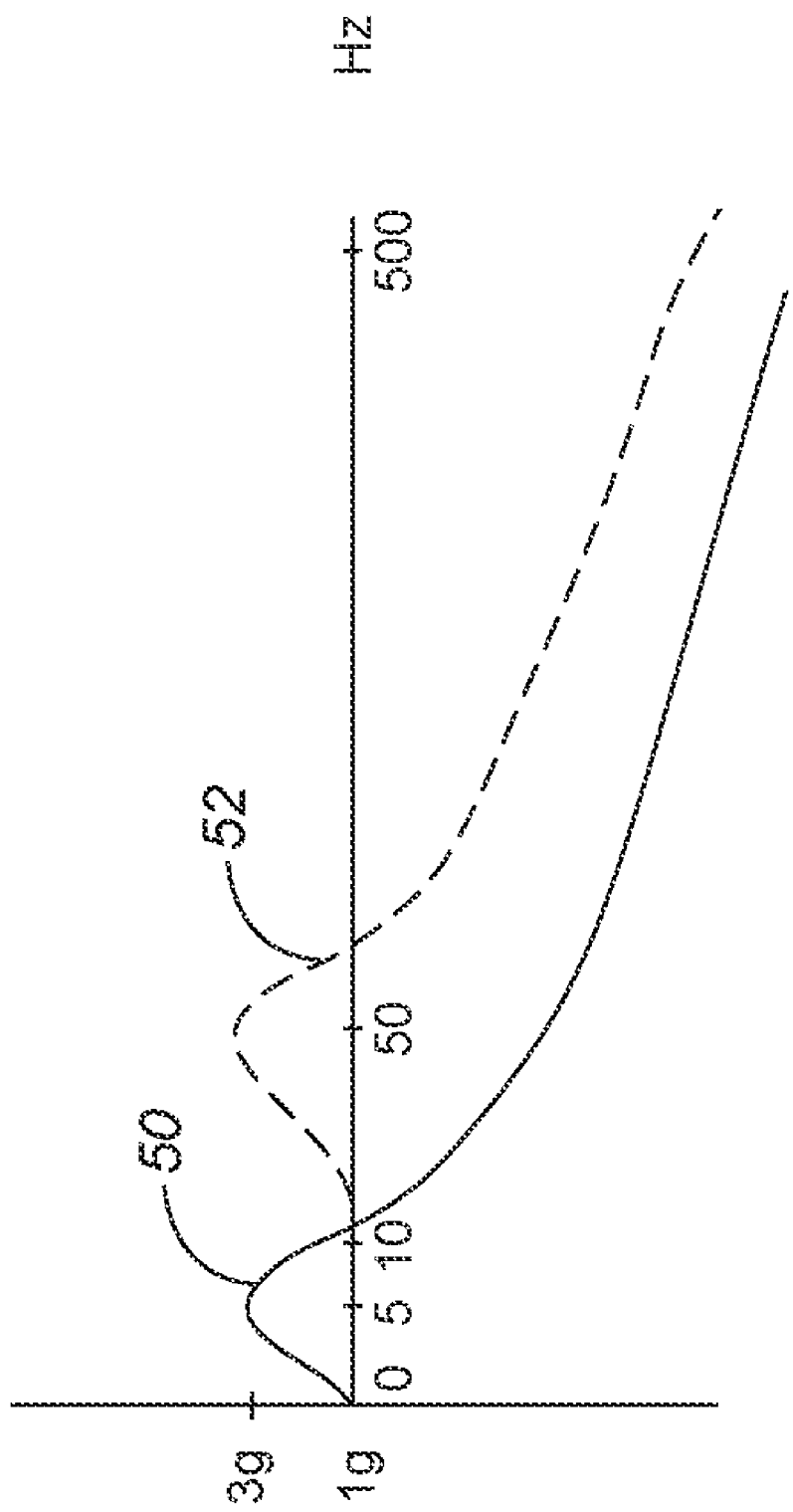
FIG. 5 illustrates a plot of force versus vibration frequency for an embodiment of the present invention and for another approach.

FIG. 5 illustrates frequency response curves for vibration isolation systems. By increasing the capable range of motion of the spring, a system according to an embodiment of the present invention has a resulting frequency curve 50 as shown in FIG. 5. At 10 Hz, when the data pack sees 1 g of force, the system inside sees 1 g, and the hard drive housing and data pack are moving in unison. Under 10 Hz, the system is excited, such as 3 g at 5 Hz, which can be the natural resonant frequency of the system. Above 10 Hz, with an input of 1 g, the result is largely suppressed or filtered out, so that the input cannot be seen. Compare this result to a result of a stiffer system, such as in FIG. 3, which has a decreased capability of movement of the mass. The resulting curve for the stiffer system would be as shown in the dashed line 52 in FIG. 5. This stiffer approach has a response of 3 g at 50 Hz, and under 10 Hz has a uniform response of 1 g, as if it is hard mounted. A drawback of a response 52 is that the drive will see 3 g at 50 Hz and has a resonant frequency that is within the operational range, which means the drive will likely fail.

FIG. 6 illustrates a multiple orientation vibration isolation system according to an embodiment of the present invention in a first orientation, or horizontal orientation. As shown in FIG. 6, a hard drive housing 104 having two stacked 3½" hard drives 108 is supported by a vibration isolation system. (Optional hard drive heat sinks are shown on either side of the stacked hard drives in the hard drive housing.) The vibration isolation system includes a first vibration isolator 110, or first spring, and a second vibration isolator 112, or second spring. Usually the vertical vibration, in the directions represented by the double-ended arrow V, is more severe. Horizontal vibration, represented by the double-ended arrow H, and vibration across a transverse axis T are less severe. The isolators 110 and 112 support the hard drive housing 104 so that it has a resultant motion in a general direction shown by arrow 114. The resultant motion 114 is in the same plane as the primary vibration force V, but is reduced and in a circular form.

The hard drive housing 104, which can include multiple hard drives, and a vibration isolation system are provided within a hard drive module chassis 116. The vibration isolation system simultaneously provides triaxial vibration isolation in two different orientations of the hard drive module, the first of which is illustrated in FIG. 6. Triaxial vibration isolation means isolation in each of the axes V, H and T. In an embodiment, the isolators 110 and 112 can compress, roll or shear in response to a vibration force in the three axes. An embodiment of the present invention is designed to handle compression (the worst case) in each direction. The first and second vibration isolators 110 and 112 are positioned to achieve a natural resonant frequency of about 10 Hz or less, in order to isolate frequencies of greater than about 10 Hz. The first and second vibration isolators 110 and 112 connect the hard drive module housing with adjoining walls of the hard drive module chassis.

When describing the positioning of the isolators 110 and 112 with respect to the chassis 116, the adjoining walls of the chassis can be described as comprising a short wall 118 and a long wall 120. The vibration isolator 110 can be a single vibration isolator coupling the hard drive housing 104 to the chassis near a mid-point of the short wall 118 of the chassis. The isolator 112 can be a single vibration isolator coupling the hard drive housing 104 to the chassis near an opposing corner of the long wall 120 of the chassis, the opposing corner being opposite a joining corner where the adjoining walls meet.

When describing the positioning of the isolators 110 and 112 with respect to the hard drive housing 104, the hard drive module housing can be described as having first and second opposing short sides. The first short side 122 is near the joining corner of the long wall of the chassis. The second short side 124 is near the opposing corner of the long wall of the chassis. The isolator 110 can be mounted near a mid-point of the first short side 122 of the hard drive housing. The isolator 112 can be mounted between a mid-point and a corner of the second short side 124 of the hard drive housing. While the positioning of the isolators is important, known mounting methods can be used to mount the isolators.

Figure 7:
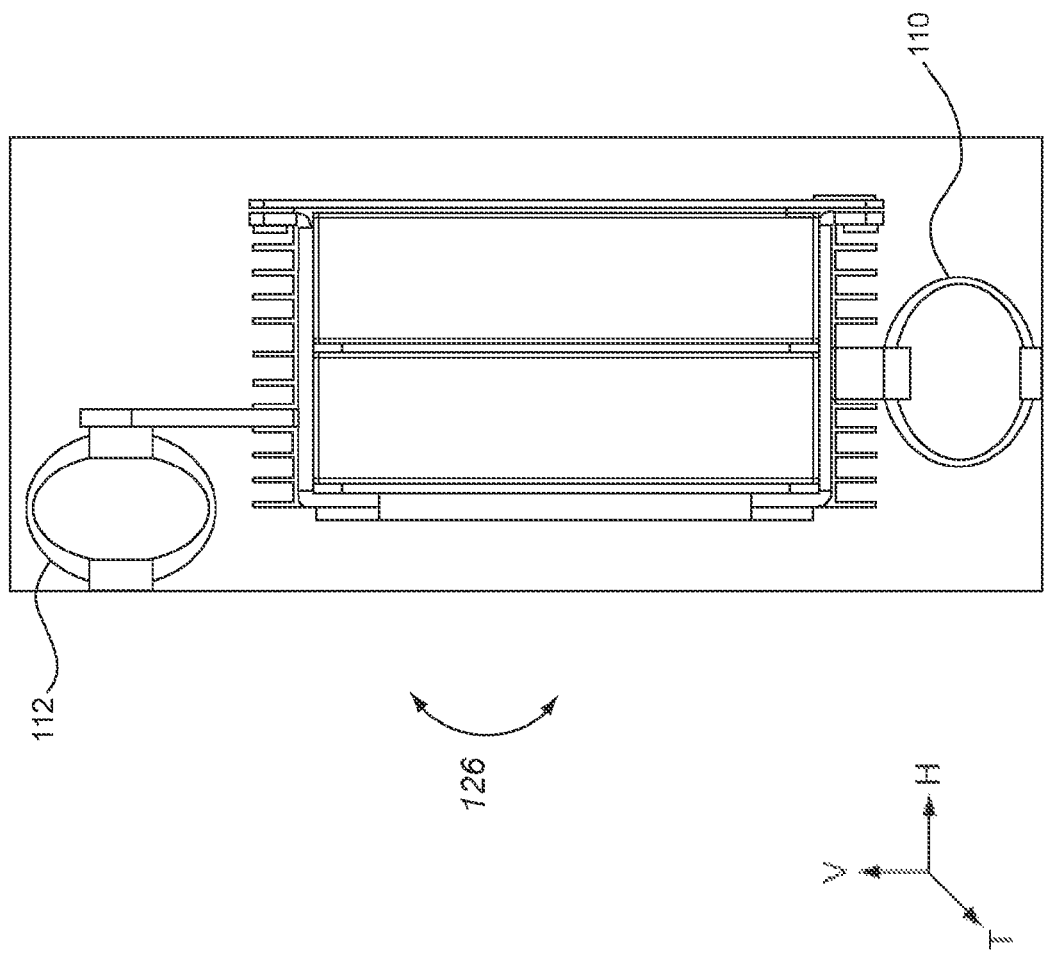
FIG. 7 illustrates a multiple orientation vibration isolation system according to an embodiment of the present invention in a second orientation.

FIG. 7 illustrates a multiple orientation vibration isolation system according to an embodiment of the present invention in a second orientation, or vertical orientation. As shown in FIG. 7, the hard drive housing 104 and isolators 110 and 112 are rotated around as compared to FIG. 6, but are still mounted in the same manner. The isolators 110 and 112 support the hard drive so that it has a resultant motion in a general direction as shown by arrow 126, the motion being not as much of a circular motion as in FIG. 6. In FIG. 7, the isolator 110 provides primary isolation and the isolator 112 stabilizes the hard drive module so that it does not flop over. In contrast, in FIG. 6, isolator 112 provides primary vibration isolation and isolator 110 provides stabilization. In both orientations, each isolator provides vibration isolation, and both co-operate to provide isolation and stabilization.

In the horizontal mounting orientation of FIG. 6, the isolator 112 is offset to the side (away from the hard drive module) to reduce the height requirement for the entire unit. If the isolator 112 were to be moved closer to the middle of the bottom of the hard drive housing, there would be virtually no motion when subjected to vibration. As the isolator 112 is moved away, it provides for more of a lever arm so that the hard drive housing has a greater range of motion. In the vertical mounting orientation of FIG. 7, in having isolator 110 at the center of the hard drive housing, there is still a good range of motion vertically because isolator 112 is far enough away from isolator 110.

The response of the vibration isolation system can be dependent on both the mass of the object being isolated, and on properties of the isolators. When the hard drive housing includes two 750 Gb hard drives, each can have a mass of 1.6 lbs, or 3.2 lbs total. With one isolator in compression and one in roll, the resultant force on each is 1.6 lbs. When isolators 110 and 112 are implemented as identical isolators, the resultant natural frequency of the system can be somewhere above 22 Hz, which can be sufficient in some cases. It was also discovered that such a system was unstable at some frequencies above 100 Hz which caused abnormal resonant frequencies at 130 Hz and 260 Hz. To achieve a natural frequency below 10 Hz and a cross over frequency of no greater than 1 g at 10 Hz, mass is preferably added to the system. Through laboratory testing a desired response was achieved in both orientations with a total mass of 6 lbs. In one embodiment, 0.5 lbs of mass was added to the existing mass of the hard drives and housing to achieve this desired total mass of the object to be isolated. This mass can be added as part of the weight of the hard drive housing, or as part of an additional cover plate. To obtain more a response more consistent with the desired vibration isolation, an isolator combination using two dissimilar isolators can be used.

Figure 8:
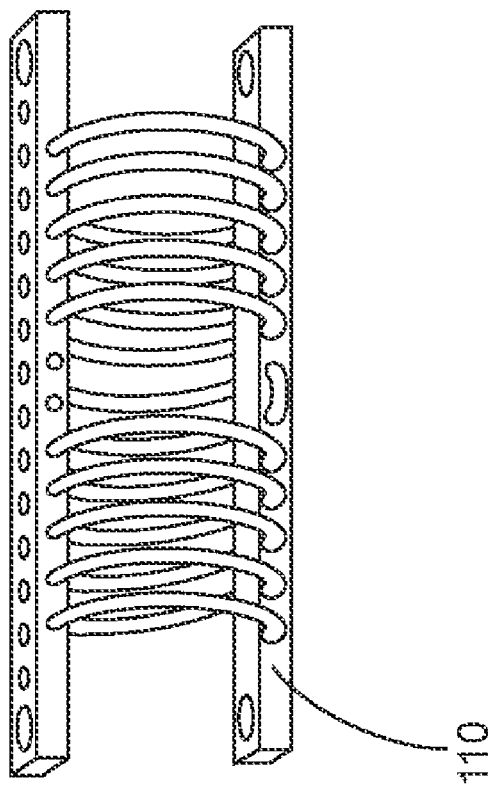
FIG. 8 illustrates exemplary first and second vibration isolators for use in a multiple orientation vibration isolation system according to an embodiment of the present invention.
Figure 8:
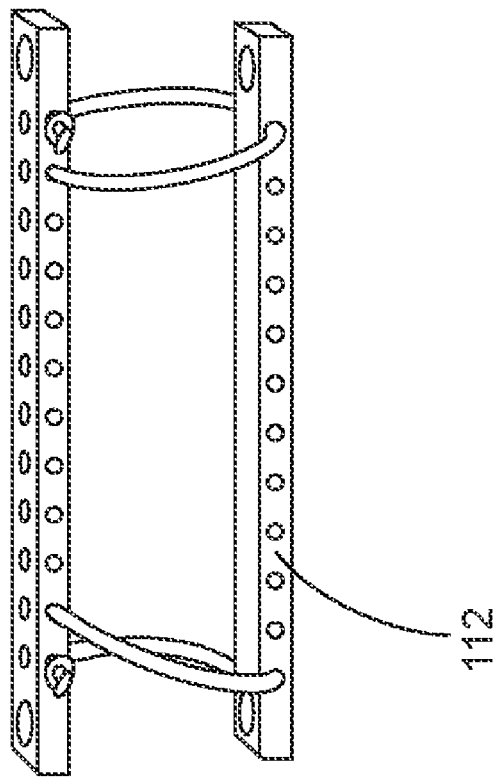

FIG. 8 illustrates exemplary first and second vibration isolators for use in a multiple orientation vibration isolation system according to an embodiment of the present invention. In this embodiment, isolators 110 and 112 are different isolators, to provide isolation in relation to the mass distribution. For example, in the horizontal mounting orientation of FIG. 6, isolator 110 can have a slightly different coefficient of stiffness when compared with isolator 112. In the vertical mounting orientation of FIG. 7, the center of mass of the hard drive housing 104 is through the isolator 110, whereas isolator 112 in FIG. 6 does not have the center of mass through it. Since the distribution of mass is not the same, they behave differently.

The isolators 110 and 112 shown in FIG. 8 are wire rope isolators. The isolator 110 can have upper and lower retaining bars retaining a plurality of wire loops between opposing ends of the retaining bars. For example, the isolator 110 can be chosen from the WR2 series of wire rope isolators available from Enidine Incorporated, of Orchard Park, N.J. Table 1 shows WR2 series model numbers and their specifications which are exemplary wire rope isolators that can be used for isolator 110. Each model is also available in different mounting options, which adds a further letter to the end of the model number, where [ ] is shown.

TABLE 1

Exemplary specifications for vibration isolator 110

| Model No. | Height (in.) | Width (in.) | Unit Weight (lbs.) |
|---|---|---|---|
| WR2-100-10-[ ] | 0.70 | 1.00 | 0.05 |
| WR2-200-10-[ ] | 0.80 | 1.10 | 0.05 |
| WR2-400-10-[ ] | 1.00 | 1.20 | 0.07 |
| WR2-600-10-[ ] | 1.10 | 1.30 | 0.07 |
| WR2-700-10-[ ] | 1.20 | 1.40 | 0.07 |
| WR2-800-10-[ ] | 1.30 | 1.50 | 0.07 |

Due to space constraints in a particular embodiment, an isolator 110 no greater in height and width than the WR2-800 is preferred, though other embodiments may have different space constraints, or no space constraints.

The isolator 112 can have first upper and lower retaining bars retaining only two wire loops. The first wire is loop mounted at a first end of the first retaining bars, and the second wire loop is mounted at an opposing end of the first retaining bars. For example, the isolator 112 can be chosen from the WR3 series of wire rope isolators available from Enidine Incorporated, or Orchard Park, N.J. Table 2 shows WR3 series model numbers and their specifications which are exemplary wire rope isolators that can be used for isolator 112. Each model is also available in different mounting options, which adds a further letter to the end of the model number, where [ ] is shown.

TABLE 2

Exemplary specifications for vibration isolator 112

| Model No. | Height (in.) | Width (in.) | Unit Weight (lbs.) |
|---|---|---|---|
| WR3-100-10-[ ] | 0.90 | 1.10 | 0.14 |
| WR3-200-10-[ ] | 1.00 | 1.20 | 0.15 |
| WR3-400-10-[ ] | 1.10 | 1.30 | 0.15 |
| WR3-600-10-[ ] | 1.30 | 1.50 | 0.15 |
| WR3-700-10-[ ] | 1.40 | 1.60 | 0.16 |
| WR3-800-10-[ ] | 1.50 | 1.70 | 0.18 |

The WR3-600-2 has approximately the same width and height as the WR2-800-10. Though the WR3 series of wire rope isolators include a plurality of wire loops, in an embodiment of the present invention, many of the wire loops are removed so that the wire rope isolator only has two wire loops, one at each end. This has been shown to provide better characteristics in terms of achieving the desired natural frequency of the vibration isolation system according to an embodiment of the present invention, of which isolator 112 is a component.

Figure 9:
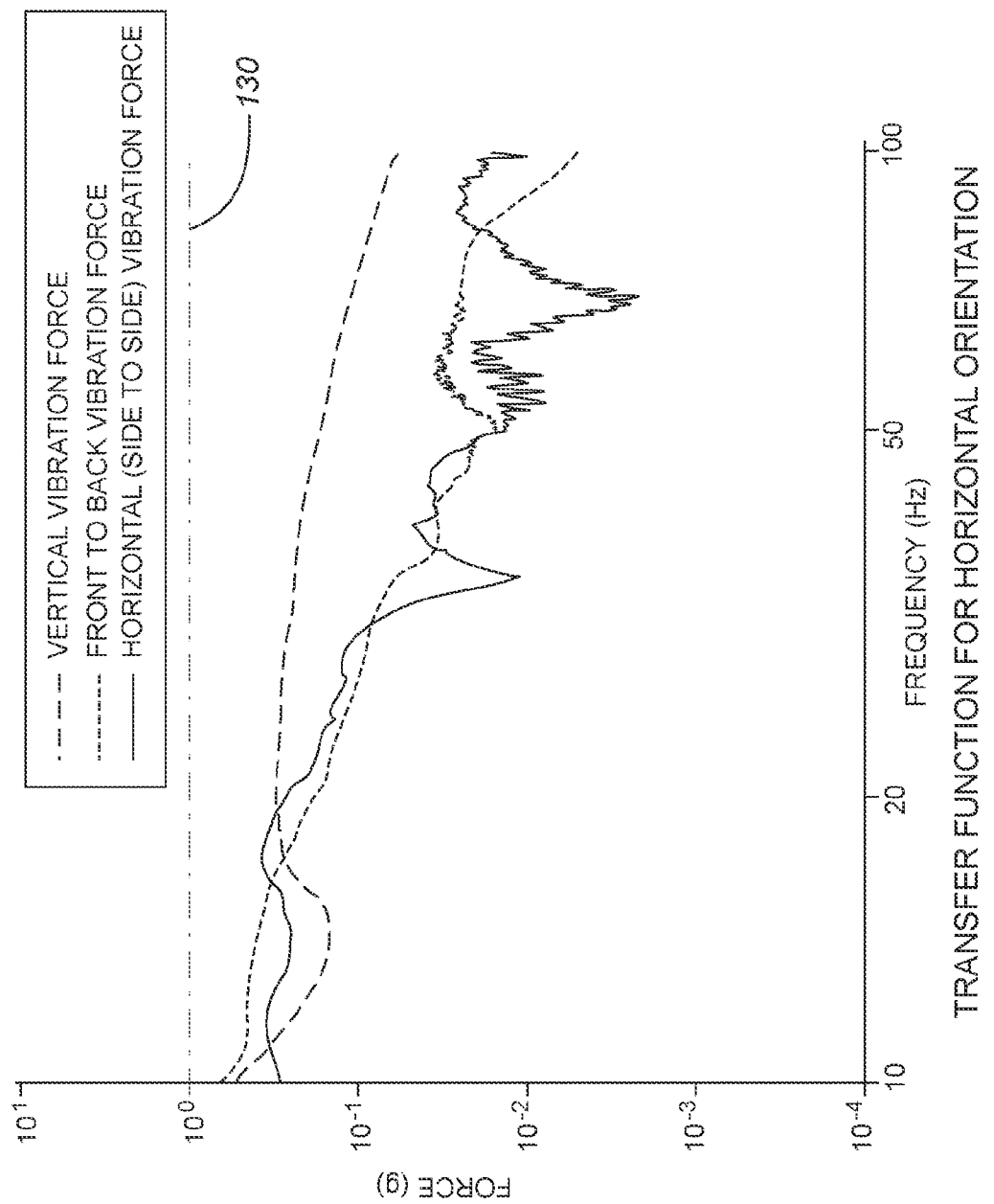
FIG. 9 graphically illustrates a transfer function for a mobile event recorder data pack for a horizontal mounting configuration using a vibration isolation system according to an embodiment of the present invention having dissimilar vibration isolators.
Figure 10:
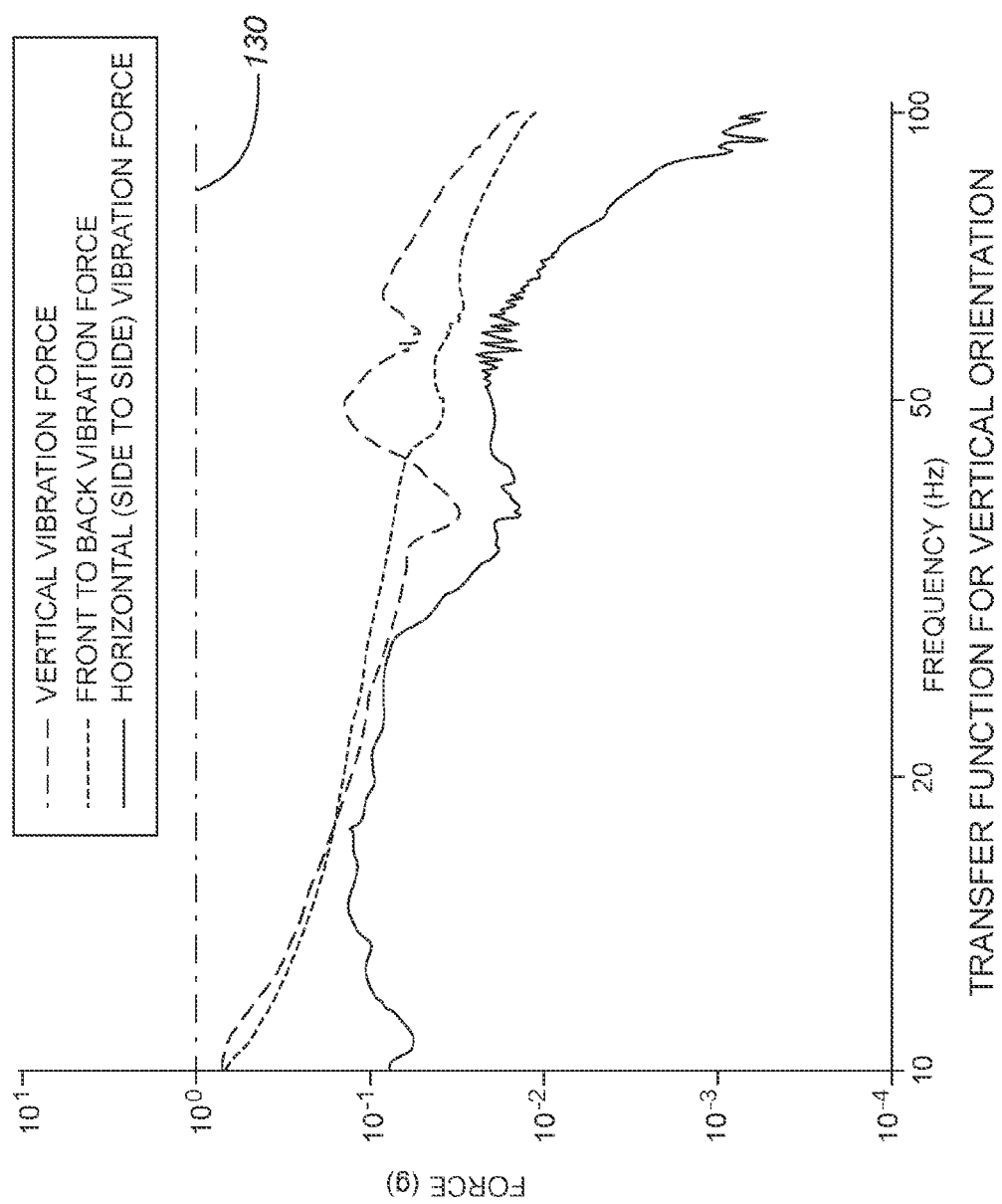
FIG. 10 graphically illustrates a transfer function for a mobile event recorder data pack for a vertical mounting configuration using a vibration isolation system according to an embodiment of the present invention having dissimilar vibration isolators.

FIG. 9 graphically illustrates a transfer function, or resultant response, for a mobile event recorder data pack for a horizontal mounting configuration using a vibration isolation system according to an embodiment of the present invention having dissimilar vibration isolators. FIG. 10 graphically illustrates a similar transfer function for the vertical mounting configuration. The transfer functions of FIGS. 9 and 10 were each measured using a triaxial accelerometer given a 1 g sine input (shown as input vibration 130) from 10 Hz to 100 Hz, with 0.5 lbs of added weight, and using the dissimilar wire rope isolators shown in FIG. 8. The transfer functions in FIGS. 9 and 10 show that the resultant response in each of the vertical, horizontal (side to side) and transverse (front to back) directions/axes is lower in magnitude than the input vibration. This illustrates the triaxial vibration isolation provided in each of the two mounting orientations according to embodiments of the present invention.

The performance curves in FIGS. 9 and 10 can be extrapolated to infer that the natural frequency of the system, at 1.5 lbs per isolator, will be about 5 Hz for this embodiment. The natural frequency of the system can be shifted lower or higher, depending on the isolator size used. Size requirements for the mobile event recorder data pack can affect the isolator sizes that can be used. In another embodiment with less stringent size requirements and a larger permissible travel for the hard drive housing, the isolators are positioned to achieve a natural resonant frequency of about 2 Hz. This lower natural resonant frequency provides increased vibration isolation in applications where a larger isolator can be accommodated.

A vibration isolation system according to an embodiment of the present invention is contained within the hard drive module and the event recorder data pack unit, and it is consistent in the sense that it is configured at the manufacturing level. Its performance is repeatable since it is contained within the unit and unaffected by variations due to installation. Other known products provide vertical vibration isolation only and provide no isolation in any other orientation; they are also not repeatable since they are strictly dependent on how the unit is installed and mounted in a specialized manner with cables extending out of the unit. A unit according to an embodiment of the present invention can be mounted to the vehicle without any vibration isolation provided external to the unit.

Embodiments of the present invention use commercial, off-the shelf hard drives intended for office use. The isolation system and the thermal control system are applied directly to those hard drives, to allow them to function in a mobile environment. This functionality cannot be achieved by performing isolation at a system level, as in known approaches. Mobile 2½" hard drives have a capacity of up to about 200 Gb, whereas standard 3½" hard drives have a capacity of up to about 750 Gb. Using two 3½" drives, a total capacity of 1.5 Terabytes is available. Standard hard drives are expected to always have higher storage capacity compared to mobile hard drives. The same offset mounting method to allow multiple (two) orientations can be used for mobile drives or for 3½" drives, with appropriate sizing modifications.

As mentioned earlier, it is often desirable to provide more than one environmental control feature in a mobile event recorder data pack. In an embodiment of the present invention, the triaxial vibration isolation system as described above is combined with a heat dissipation system to transfer heat from the hard drive to outside the housing without an air passage to the outside of the sealed casing. The heat dissipation system can include a heat sink and a thermoelectric module, and preferably includes an internal heat sink, an internal fan, an external heat sink and an external fan, with the thermoelectric module placed between the internal and external heat sinks without breaking the environmental seal. The heat dissipation system can further include one or more hard drive module heat sinks to increase the efficiency of heat transfer between the hard drive(s) and the internal fan.

Figure 11:
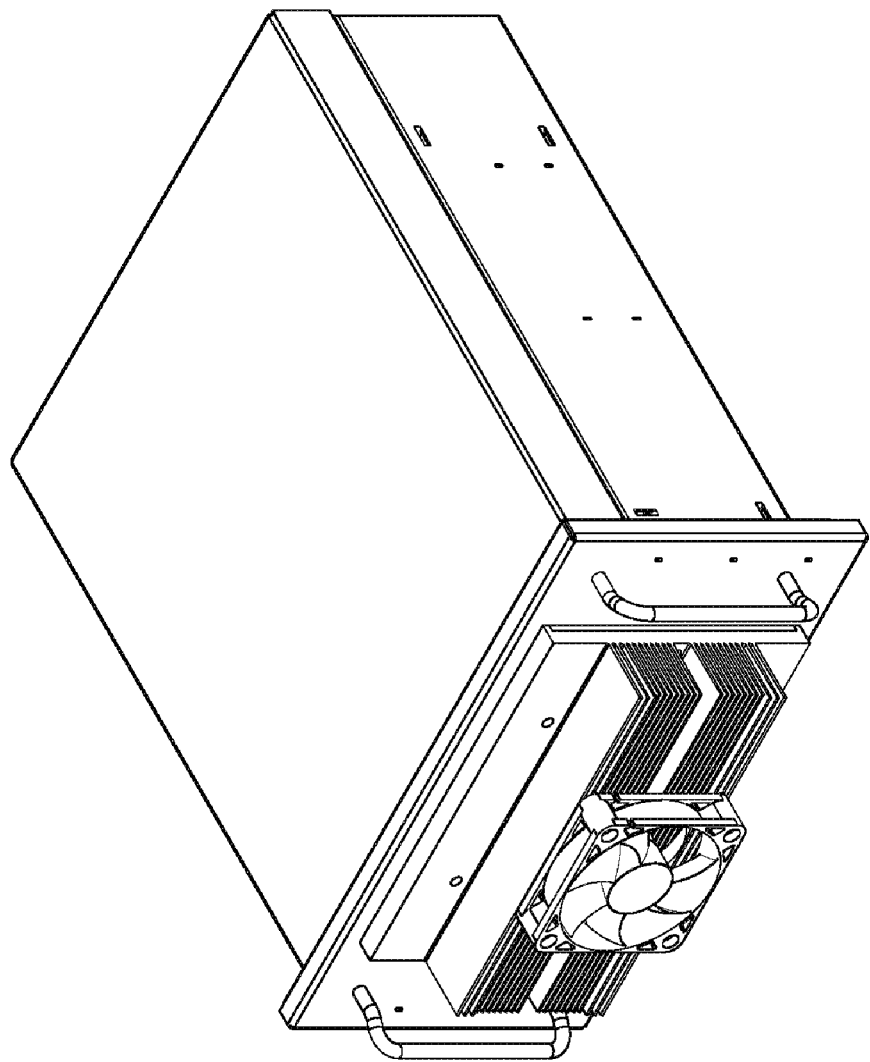
FIG. 11 is a perspective view of a hard drive module for a mobile digital video recorder (MDVR) according to an embodiment of the present invention that includes a heat dissipation system.

FIG. 11 is a perspective view of a hard drive module for a mobile digital video recorder (MDVR) according to an embodiment of the present invention. While a 2½" hard drive only draws about two and a half watts of power, a larger 3½" drive draws about 13 watts. Since an arrangement with two 3½" drives will draw about 26 watts of power, circulation of the air inside the box creates a need for more heat dissipation. Embodiments of the present invention implement an air to air cooler in which the thermoelectric cooler is preferably not connected directly to the hard drive; instead, a fan blows and circulates air through a heat sink.

Figure 13:
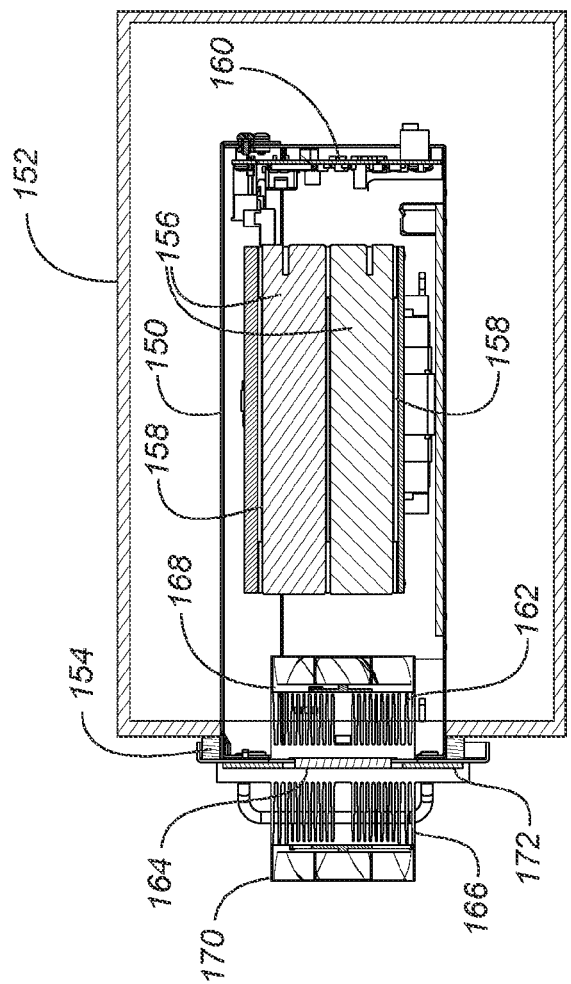
FIG. 13 is a cross-sectional view taken along line A-A through the center of the hard drive module and the outer enclosure of FIG. 12.
Figure 12:
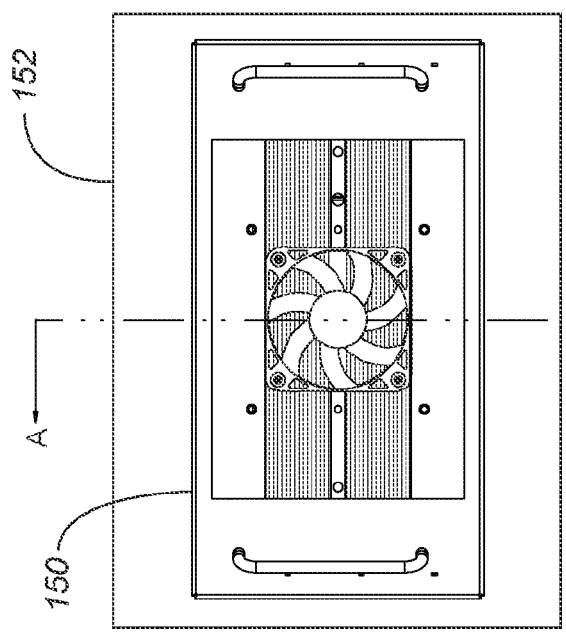
FIG. 12 is a front view of the hard drive module of FIG. 11 mounted in an outer enclosure according to an embodiment of the present invention.

FIG. 12 is a front view of a hard drive module of FIG. 11 including a hard drive module chassis 150 mounted in an outer enclosure 152. The outer enclosure can be a mobile digital video recorder (MDVR) main chassis, or a cover for the hard drive module. FIG. 13 is a cross-sectional view taken along line A-A through the center of the hard drive module and the outer enclosure of FIG. 12. In FIG. 13, an outer chassis environmental seal 154 is provided between the outer enclosure 152 and the hard drive module chassis 150. Two 3½" hard drives (HDDs) 156 are shown, though more can be included with appropriate modifications. The HDDs 156 are preferably housed in a HDD housing 158, also called a support or basket. Vibration isolators (not shown) are attached to the HDDs, either directly or to the HDD housing, preferably in a configuration as described earlier for triaxial vibration isolation in both horizontal and vertical mounting orientations. An internal circuit card 160 includes hardware and/or software to implement a temperature control system that provides thermal control based on temperature thresholds. The circuit card is described in further detail in the above-mentioned U.S. patent application Ser. No. 11/106,515, which is incorporated herein by reference.

In a presently preferred embodiment, the event recorder data pack comprises a heat dissipation system, which includes an internal heat sink 162, a TEC 164, and an external heat sink 166. The heat dissipation system optionally includes an internal fan 168 and/or an external fan 170. One embodiment uses an air-to-air cooler (fans inside and outside). This embodiment can increase the temperature range by extracting heat directly from the hard drives to the outside, bypassing the enclosure and any internal electronics. Another embodiment of the present invention has the same vibration isolation system but the air-to-air cooler has forced air on one side but not on the other side (fanless outside).

The internal heat sink 162 is connected via a conduction path to the TEC 164. The internal fan 168 draws heat from the air, which is produced by the HDDs, onto the internal heat sink 162. The internal fan 168 and internal heat sink 162 are internal to a first sealed environment within the hard drive module. The TEC 164 is contained between the internal and external heat sinks. The TEC can be provided within a front cover environmental seal 172, sealing the external heat sink 166 and the hard drive module chassis 150. The TEC is connected to the external heat sink 166, which is external to the sealed environment. The external heat sink 166 can then be connected to an external fan 170, which draws heat away from the TEC 164 and external heat sink 166 to the external environment. Therefore, the heat is drawn from air within the sealed environment and expelled via air outside the sealed environment. While in known approaches heat transfer can occur end-to-end as an air to conduction process, embodiments of the present invention provide an air to air end-to-end process.

Figure 14:
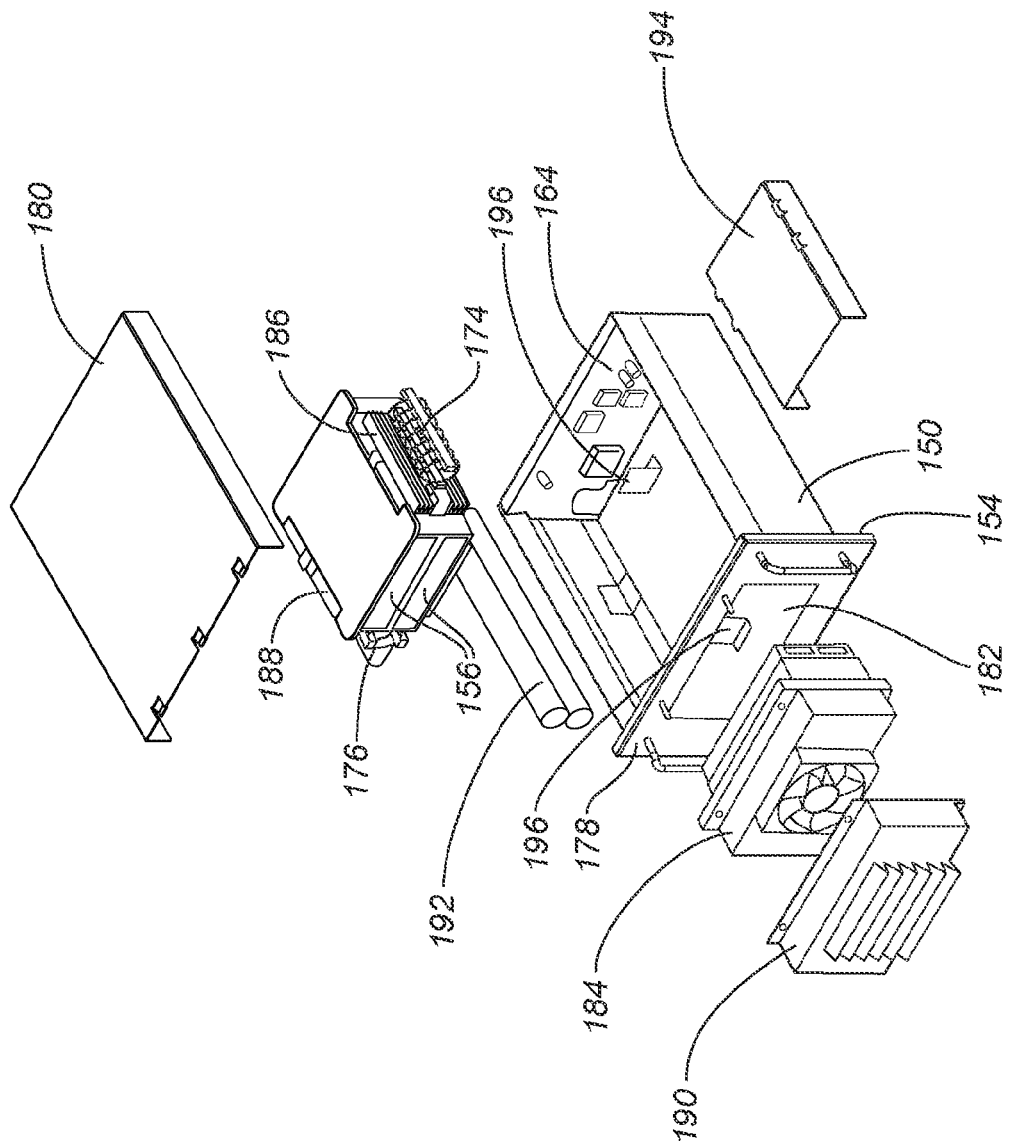
FIG. 14 is an exploded perspective view of an MDVR according to an embodiment of the present invention.

FIG. 14 is an exploded perspective view of hard drive module according to another embodiment of the present invention. This view shows first and second vibration isolators 174 and 176. A front cover plate 178 of the hard drive module chassis 150 co-operates with an outer chassis environmental seal 154 and a MDVR outer enclosure (not shown) to form a sealed casing. The hard drive module cover 180 can also contribute to forming the sealed casing. The front cover plate 178 can define an accessory opening 182 for receiving a heat dissipation system 184. The heat dissipation system 184 transfers heat from the hard drives 156 to outside the sealed outer enclosure without an air passage to the outside of the sealed outer enclosure. The heat dissipation system 184 mates with the accessory opening 182 to the cover of the sealed hard drive module chassis, and also contributes to forming the sealed casing.

In addition to the elements described with respect to FIG. 13, a hard drive module heat sink 186 is shown in FIG. 14, which is connected to the hard drives. The hard drive module heat sink 186 provides improved heat transfer from the hard drives to the surrounding air, from which the internal fan draws the heat and eventually leads it outside the sealed casing. In an embodiment, an optional second hard drive module heat sink 188 can be placed on the opposite side of the hard drive modules from the first hard drive module heat sink 186 shown in FIG. 14 in order to provide increased heat transfer. The hard drive module heat sinks can be attached or bolted directly to the hard drives, so that as the hard drives create heat, they transfer the heat to the hard drive module heat sink(s). The heat is then pulled off the hard drive module heat sinks by the internal fan towards the internal heat sink, across the TEC and to the external heat sink and ejected via the external fan. In an embodiment, a heat dissipation system cover 190 can be provided to prevent damage to or interference with the external fan. FIG. 14 also shows an exemplary location of batteries 192 used to power the system, as well as a hard drive slug 194 that can be used to provide additional weight to the hard drive housing when only one hard drive is used, to achieve the desired vibration isolation response.

With systems according to embodiments of the present invention, having such a low natural frequency means that the system can move around easily. Vibration comprises multiple events. For example, a 5 Hz vibration has 5 cycles every second. It can be desirable to have a constraint not only for vibration, but also for single event vibration, such as a severe shock. Such a shock, which can be in the range of about 10-30 g, can be caused, for example, by a pothole or a vehicle accident. A secondary system can be provided to protect the drives and internal components from damage. FIG. 14 shows a bumper system including a plurality of bumpers 196, which can be implemented as neoprene rubber bumpers. Preferably, two bumpers are provided in each axis, thereby providing triaxial protection. In the embodiment of FIG. 14, the two visible bumpers 196 are provided as tabs on the base for providing horizontal restraint. Another pair can be provided on the underside of the cover for transverse restraint, and a further pair can be provided to provide vertical restraint, such as one on the cover and one on the base. Other configurations of the bumpers within the bumper system are possible.

In embodiments of the present invention an air medium is used for conduction between the hard drives and the TEC, instead of coupling the TEC directly to the hard drive. The fans circulate air between the heat sinks so that it allows the heat to actually transfer from the air to the heat sink, which provides increased efficiency rather than simply relying on natural conduction. A fan decreases the thermal resistance in the system so that heat can travel more quickly. The system can be implemented without the fans at a lower efficiency. Without the fans, the heat dissipation system according to an embodiment of the present invention can cool the environment by a couple of degrees, whereas with the fans the system can be cooled by about 10-20 degrees.

As mentioned earlier, there is substantially no air that passes from the interior to the exterior of the sealed casing; heat transfer from the inside of the sealed casing to the outside of the sealed casing is accomplished via conduction. The seal preferably seals from both water and dust, which makes it difficult to eject heat outside the sealed box. Embodiments of the present invention permit this heat transfer without creating or requiring an air path, which is different from hard drive cooling systems on a typical personal computer that rely on air paths from the inside of the PC casing to the outside.

The function of the TEC in embodiments of the present invention is similar to the function of a refrigerator coolant, such as Freon™, in a refrigerator. However, in the case of refrigerator coolant, it goes inside the refrigerator and pulls heat from the air, and then that heat gets pulled; when the coolant goes to the outside of the fridge, it evaporates, and then heat gets released to the outside air. Moreover, a refrigerator or portable cooler or refrigeration unit can be closed to provide a seal, but it is only temporarily sealed in order to produce the refrigeration. It is also not dust tight when it is sealed.

According to embodiments of the present invention, air is being circulated within the sealed casing; the air gets pulled to the internal heat sink, the TEC draws the heat from the inside to the outside of the sealed casing and ejects to the air. For embodiments of the present invention, the system is sealed is to keep out water and environmental contaminants, like dust, to protect the functioning of the equipment within the sealed casing.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A mobile event recorder data pack system for use in a vehicle, the system comprising:
   an outer enclosure against which a hard drive module is sealed, and in which contents of the hard drive module are sealed, the hard drive module including:
   a hard drive module chassis;
   a plurality of standard hard drives,
   a hard drive housing retaining the plurality of standard hard drives;
   a multiple orientation vibration isolation system provided between the hard drive housing and the hard drive module chassis to simultaneously provide triaxial vibration isolation when the mobile event recorder data pack system is mounted in a vertical mounting position and in a horizontal mounting position, the multiple orientation vibration isolation system including only two vibration isolators provided as first and second vibration isolators, the first and second vibration isolators connecting the hard drive housing with adjoining walls of the hard drive module chassis, the first and second vibration isolators positioned on two different and perpendicular planes of the hard drive module to achieve a natural resonant frequency of less than about 10 Hz in both the horizontal mounting position and the vertical mounting position.

2. The mobile event recorder data pack system of claim 1 wherein the multiple orientation vibration isolation system has a natural resonant frequency below about 5 Hz.

3. The mobile event recorder data pack system of claim 1 wherein the multiple orientation vibration isolation system has a natural resonant frequency of about 2 Hz.

4. The mobile event recorder data pack system of claim 1 wherein the multiple orientation vibration isolation system isolates the hard drives from vibration frequencies greater than about 2 Hz.

5. The mobile event recorder data pack system of claim 1 wherein the multiple orientation vibration isolation system isolates the hard drives from vibration frequencies greater than about 5 Hz.

6. The mobile event recorder data pack system of claim 1 wherein the multiple orientation vibration isolation system isolates the hard drives from vibration frequencies greater than about 10 Hz.

7. The mobile event recorder data pack system of claim 1 wherein the multiple orientation vibration isolation system isolates the hard drives from vibration frequencies between about 10 Hz and about 500 Hz.

8. The mobile event recorder data pack system of claim 1 wherein the multiple orientation vibration isolation system limits a peak to peak displacement of the hard drive housing to between about 0.5 inches and about 1.0 inch.

9. The mobile event recorder data pack system of claim 1 wherein the hard drive module housing and the hard drives have a combined weight of about 6 lbs.

10. The mobile event recorder data pack system of claim 1 wherein the adjoining walls of the hard drive module chassis comprise a short wall and a long wall, the first vibration isolator comprises a single vibration isolator coupling the hard drive module housing to the chassis near a mid-point of the short wall of the chassis, and the second vibration isolator comprises a single vibration isolator coupling the hard drive module housing to the chassis near an opposing corner of the long wall of the chassis, the opposing corner being opposite a joining corner where the adjoining walls meet.

11. The mobile event recorder data pack system of claim 10 wherein the hard drive housing has first and second opposing short sides, the first short side being near the joining corner of the long wall of the hard drive module chassis and the second short side being near the opposing corner of the long wall of the hard drive module chassis, the first vibration isolator being mounted near a mid-point of the first short side of the hard drive housing, and the second vibration isolator being mounted between a mid-point and a corner of the second short side of the hard drive housing.

12. The mobile event recorder data pack system of claim 1 wherein the multiple orientation vibration isolation system isolates a horizontal vibration force and a vertical vibration force in a plane perpendicular to the horizontal vibration force such that a resultant vibration motion is in circular form and in the same plane as the horizontal vibration force with a smaller magnitude than the horizontal vibration force.

13. The mobile event recorder data pack system of claim 1 wherein the first and second vibration isolators comprise first and second wire rope vibration isolators.

14. The mobile event recorder data pack system of claim 13 wherein:
the first vibration isolator comprises a first wire rope vibration isolator having first upper and lower retaining bars retaining only two wire loops, a first wire loop mounted at a first end of the first upper and lower retaining bars and a second wire loop mounted at an opposing end of the first upper and lower retaining bars; and
the second vibration isolator comprises a second wire rope vibration isolator having second upper and lower retaining bars retaining a plurality of wire loops between opposing ends of the second upper and lower retaining bars.

15. The mobile event recorder data pack system of claim 1 further comprising a heat dissipation system to transfer heat from the standard hard drives to outside the outer enclosure without an air passage to the outside of the sealed outer enclosure.

16. The mobile event recorder data pack system of claim 15 wherein the heat dissipation system comprises:
an internal heat sink inside the hard drive module;
an external heat sink outside the outer enclosure; and
a thermoelectric module placed between the internal and external heat sinks without breaking an environmental seal between the external heat sink and the outer enclosure.

17. The mobile event recorder data pack system of claim 16 wherein the heat dissipation system further comprises an external fan mounted to the external heat sink.

18. The mobile event recorder data pack system of claim 16 wherein the heat dissipation system further comprises an internal fan mounted to the internal heat sink.

19. The mobile event recorder data pack system of claim 16 wherein the heat dissipation system further comprises a hard drive module heat sink connected to the hard drives.

20. The mobile event data recorder of claim 1 further including a temperature control system and a humidity control system.

21. A hard drive module for an mobile event recorder data pack system for use in a vehicle, the hard drive module comprising:
a hard drive module chassis;
a plurality of standard hard drives;
a hard drive housing retaining the plurality of standard hard drives; and
a multiple orientation vibration isolation system provided between the hard drive housing and the hard drive module chassis to simultaneously provide triaxial vibration isolation when the mobile event recorder data pack system is mounted in a vertical mounting position and in a horizontal mounting position, the multiple orientation vibration isolation system including only two vibration isolators provided as first and second vibration isolators, the first and second vibration isolators connecting the hard drive housing with adjoining walls of the hard drive module chassis, the first and second vibration isolators positioned on two different and perpendicular planes of the hard drive module to achieve a natural resonant frequency of less than about 10 Hz in both the horizontal mounting position and the vertical mounting position.

22. The hard drive module of claim 21 wherein the multiple orientation vibration isolation system has a natural resonant frequency below about 5 Hz.

23. A mobile event recorder data pack for use in a vehicle, comprising:
a hard drive module including
a hard drive module chassis,
a plurality of standard hard drives,
a hard drive housing retaining the plurality of standard hard drives,
a front cover plate defining an accessory opening;
an outer enclosure against which the hard drive module is sealed, and in which contents of the hard drive module are sealed, the outer enclosure defining a hard drive module opening to receive the hard drive module;
a heat dissipation system to transfer heat from the hard drives to outside the sealed outer enclosure without an air passage to the outside of the sealed outer enclosure, the heat dissipation system mating with the accessory opening in the front cover plate of the hard drive module;

a hard drive module environmental seal to seal the heat dissipation system to the front an outer chassis environmental seal co-operating with the outer enclosure and the hard drive module to form a sealed casing;

a multiple orientation vibration isolation system provided between the hard drive housing and the hard drive module chassis to simultaneously provide triaxial vibration isolation when the mobile event recorder data pack system is mounted in a vertical mounting position and in a horizontal mounting position, the multiple orientation vibration isolation system including only two vibration isolators provided as first and second vibration isolators, the first and second vibration isolators connecting the hard drive housing with adjoining walls of the hard drive module chassis, the first and second vibration isolators positioned on two different and perpendicular planes of the hard drive module to achieve a natural resonant frequency of less than about 10 Hz in both the horizontal mounting position and the vertical mounting position.

24. The mobile event recorder data pack system of claim 23 further comprising:
an outer chassis environmental seal provided between the hard drive module and the hard drive module opening; and
a front cover environmental seal provided between the front cover plate and the heat dissipation system.

25. The mobile event recorder data pack system of claim 23 wherein the heat dissipation system comprises:
an internal heat sink inside the hard drive module;
an external heat sink outside the chassis;
a thermoelectric module placed between the internal and external heat sinks without breaking an environmental seal between the external heat sink and the sealed hard drive module chassis;
an external fan mounted to the external heat sink;
an internal fan mounted to the internal heat sink; and
a hard drive module heat sink connected to the hard drives.

26. The mobile event recorder data pack system of claim 1 wherein the multiple orientation vibration isolation system comprises only the first and second vibration isolators.

27. The hard drive module of claim 21 wherein the multiple orientation vibration isolation system comprises only the first and second vibration isolators.

28. The mobile event recorder data pack system of claim 23 wherein the multiple orientation vibration isolation system comprises only the first and second vibration isolators.

* * * * *